(12) United States Patent
Yang (10) Patent No.: US 11,484,468 B2
(45) Date of Patent: Nov. 1, 2022

(54) ACUPUNCTURE NEEDLE PACKAGING METHOD AND ACUPUNCTURE NEEDLE

(71) Applicant: Pan Jong Yang, Gwangju (KR)

(72) Inventor: Pan Jong Yang, Gwangju (KR)

( * ) Notice: Subject to any disclaimer, the term of this patent is extended or adjusted under 35 U.S.C. 154(b) by 253 days.

(21) Appl. No.: 16/832,261

(22) Filed: Mar. 27, 2020

(65) Prior Publication Data

US 2021/0000688 A1    Jan. 7, 2021

(30) Foreign Application Priority Data

Feb. 28, 2019 (KR) .......................... 10-2019-0024164

(51) Int. Cl.
*A61H 39/08* (2006.01)
*A61H 39/06* (2006.01)

(52) U.S. Cl.
CPC ..... *A61H 39/083* (2013.01); *A61H 2201/102* (2013.01)

(58) Field of Classification Search
CPC ...... A61H 39/00; A61H 39/08; A61H 39/083; A61H 39/086
See application file for complete search history.

(56) References Cited

U.S. PATENT DOCUMENTS

2007/0185517 A1 * 8/2007 Nakano .................. A61H 39/08
606/189

FOREIGN PATENT DOCUMENTS

| JP | H0928758 A | 2/1997 |
|---|---|---|
| KR | 200351630 Y1 | 5/2004 |
| KR | 101458486 B1 | 11/2014 |
| KR | 10-2017-0062088 A | 6/2017 |
| KR | 102060011 B1 | 12/2019 |
| WO | 2006-067832 A1 | 6/2006 |

OTHER PUBLICATIONS

International Search Report and Written Opinion, PCT/IB2020/000222, dated Aug. 28, 2020, 9 pages.

* cited by examiner

*Primary Examiner* — Todd J Scherbel
(74) *Attorney, Agent, or Firm* — United One Law Group LLC; Kongsik Kim; Jhongwoo Peck

(57) ABSTRACT

A method of acupuncture needle packaging includes inserting an acupuncture needle body of an acupuncture needle including an acupuncture needle handle at an upper portion thereof into an acupuncture needle tube starting from the acupuncture needle handle; disposing the acupuncture needle in the acupuncture needle tube in a state in which the upper portion of the acupuncture needle handle is exposed to an exterior of the acupuncture needle tube; ascending the upper portion of the acupuncture needle handle exposed to the exterior using a pressing jig; irradiating a laser to an area where the acupuncture needle tube and the acupuncture needle handle abut each other; and coupling the acupuncture needle handle and the acupuncture needle tube by thermally deforming the area where the acupuncture needle tube and the acupuncture needle handle abut each other with a heat generated by the laser.

11 Claims, 8 Drawing Sheets

FIG. 1

Related Art

ACUPUNCTURE NEEDLE PACKAGING METHOD AND ACUPUNCTURE NEEDLE

CROSS-REFERENCE TO RELATED APPLICATIONS

The present application claims the benefit of priority to Korean Patent Application KR 10-2019-0024164 filed on Feb. 28, 2019, which application is herein incorporated by reference in its entirety.

TECHNICAL FIELD

The present invention relates to an acupuncture needle and a packaging method thereof, more particularly, to an acupuncture needle and a method of coupling the acupuncture needle to a tube in a more convenient way.

RELATED ART

In general, oriental acupuncture is made of bio-compatible metals such as gold, platinum, and stainless steel. The oriental acupuncture needles include an acupuncture needle body, an acupuncture needle tip disposed on a first side of the acupuncture needle body which penetrates human skin, and an acupuncture needle handle disposed on a second side of the acupuncture needle body which is formed thicker than other parts to serve as a handle.

The principle of oriental acupuncture is a surgical therapy that cures certain diseases by controlling the radial veins in the body with external stimuli and is sometimes implemented separately from the internal medical treatment of herbal medicine, but more often concurrently. Thus, oriental acupuncture that stimulates meridian system and point and oral herbal medicine treatment are implemented at the same time, in general. Hence, oriental acupuncture therapy or acupoint injection method are gaining more attention due to the convenience and efficacy. Recently, it has become popular in Western countries as well as Eastern countries where herbal medicine is widely used.

For domestic distribution or imports and exports, acupuncture needles are individually packaged and subsequently bundled. It is generally individually packaged especially for imports or exports, due to sanitary issues.

In general, acupuncture needles are made as disposable due to hygienic reasons. A tube of the acupuncture needle is also made disposable. For this reason, one acupuncture needle and the tube thereof are packaged and distributed together. Previously, the packaging configuration of the acupuncture needle has been disclosed in the registered Korean Patent No. 10-1747750 under the subject of "acupuncture needle packaging structure."

Figure 1:
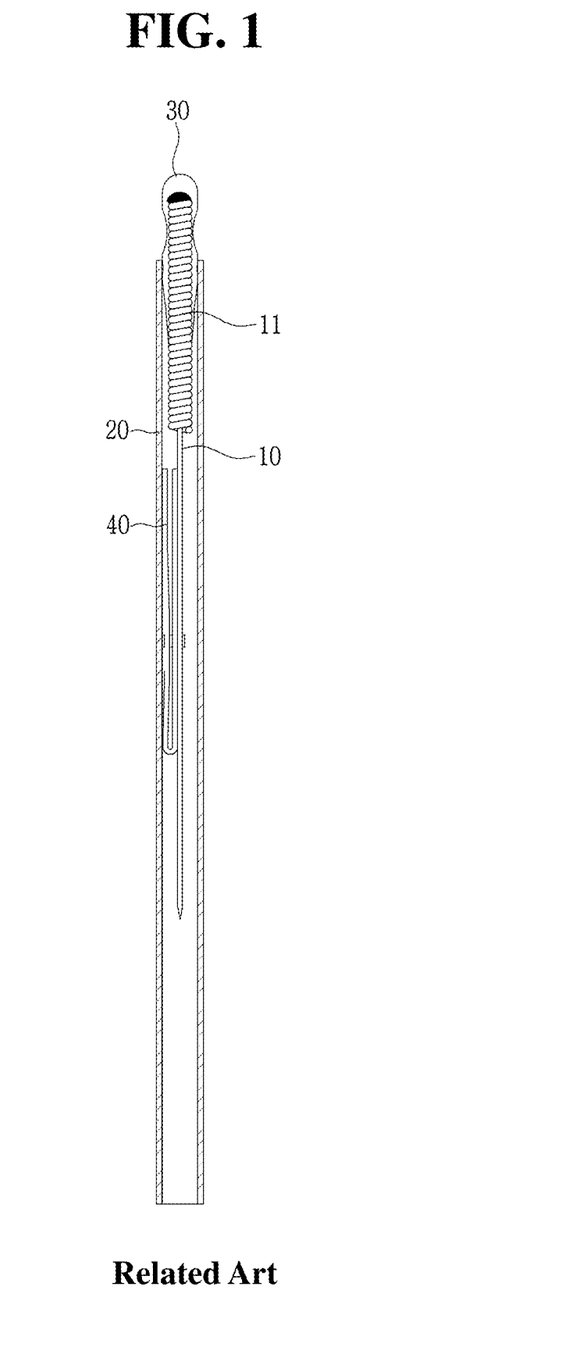
FIG. 1 is an example of a conventional acupuncture needle packaging structure in the related art.

FIG. 1 is a cross-sectional view of the package structure of a conventional acupuncture needle in the related art. As illustrated in FIG. 1, an acupuncture needle 10 is inserted within an acupuncture needle tube 20, an acupuncture needle-fixing cap 30 is inserted between the top of the acupuncture needle tube 20 and the acupuncture needle handle 11. Subsequently, a needle-fixing tension member 40 is inserted between the acupuncture needle 10 and the acupuncture needle tube 20 and is fixed to the acupuncture needle tube 20.

The conventional packaging structure for acupuncture needle in the related art has a disadvantage of requiring the separate needle-fixing cap 30 and the needle-fixing tension member 40 in addition to the acupuncture needle 10 and the acupuncture needle tube 20, which increases the cost of packaging and the number of processes for a worker.

Moreover, there is an inconvenience in separating the acupuncture needle-fixing cap 30 and the needle-fixing tension member 40 when the therapist or oriental medicine doctor who treat the patient use the acupuncture needle.

SUMMARY

An object of the present invention is to resolve the issues addressed above, and to provide acupuncture needles for more simplified and stable packaging and packaging methods of acupuncture needles.

Above objects and advantages of the present invention will be clearly understood by one of ordinary skill in the art pertinent to the technology based on the exemplary embodiments of the invention.

According to an aspect of the present invention, a method of acupuncture needle packaging may include inserting an acupuncture needle body of an acupuncture needle that includes an acupuncture needle handle at an upper portion thereof into an acupuncture needle tube starting from the acupuncture needle handle; disposing the acupuncture needle in the acupuncture needle tube in a state in which the upper portion of the acupuncture needle handle is exposed to an exterior of the acupuncture needle tube; ascending the upper portion of the acupuncture needle handle exposed to the exterior of the acupuncture needle tube vertically using a pressing jig; irradiating a laser using a laser generator to an area where the acupuncture needle tube and the acupuncture needle handle abut each other, with the acupuncture needle obliquely disposed within the acupuncture needle tube; and coupling the acupuncture needle handle and the acupuncture needle tube by thermally deforming the area where the acupuncture needle tube and the acupuncture needle handle abut each other with a heat generated at the acupuncture needle handle due to the laser irradiated with the laser generator.

In some embodiments, ⅓ to ½ of the acupuncture needle handle may be exposed to the exterior of the acupuncture needle tube, and the laser generator may irradiate the laser for one to two seconds to ⅗ to ⅔ region of the acupuncture needle handle.

The acupuncture needle tube may include a transparent polymer material selected from the group consisting of polypropylene, polyethylene, and low density polyethylene (LDPE), and the acupuncture needle handle may include a spiral shape at an outer surface thereof. When the laser is irradiated, the acupuncture needle handle and the acupuncture needle tube may be coupled.

Further, a deformation zone may be formed due to the laser at an inner wall of the acupuncture needle tube where the acupuncture needle handle abuts the acupuncture needle tube to correspond to the spiral shape of the acupuncture needle handle, and the spiral shape of the acupuncture needle handle and the deformation zone of the acupuncture needle tube may be fitted together to allow the acupuncture needle and the acupuncture needle tube to be coupled. The spiral shape of the acupuncture needle handle and the deformation zone of the acupuncture needle tube may be separated by pressing the upper portion of the acupuncture needle handle exposed to the exterior of the acupuncture needle tube.

In particular, a corrosion protection layer may be applied to the acupuncture needle body, the corrosion protection layer including 20 weight % of guanadino benzimidazol, 15 weight % of oxycarboxylic acid, 10 weight % of imidazoline thion, 15 weight % of hafnium, 10 weight % of molybdenum disulfide, 25 weight % of aluminum oxide, and 5 weight % of diglycidyl aniline. A coating thickness of the corrosion protection layer may be 7 μm. An interior of the acupuncture needle tube may be covered by a layer of anti-pollution layer including a composition with 1:0.01 to 1:2 mole ratio of amphodiglycine and sorbitol esters. Further, a circumference of the acupuncture needle tube may be applied with an aromatic substance mixed with a functional oil, the mixture including 95 to 97 weight % of the aromatic substance and 3 to 5 weight % of the functional oil. The functional oil may include 50 weight % of cardamom oil and 50 weight % of marigold oil.

According to another aspect of the present invention, a method of acupuncture needle packaging may include inserting an acupuncture needle body of an acupuncture needle that includes an acupuncture needle handle at an upper portion thereof into an acupuncture needle tube starting from the acupuncture needle handle; disposing the acupuncture needle in the acupuncture needle tube so that the upper portion of the acupuncture needle handle is exposed to an exterior of the acupuncture needle tube; inserting a pressing jig into an interior of the acupuncture needle tube to press the upper portion of the acupuncture needle handle downward; irradiating a laser using a laser generator to an area where the acupuncture needle tube and the acupuncture needle handle abut each other while the acupuncture needle is horizontally disposed within the acupuncture needle tube; and coupling the acupuncture needle handle and the acupuncture needle tube by thermally deforming the area where the acupuncture needle tube and the acupuncture needle handle abut each other with a heat that is generated at the acupuncture needle handle due to the laser irradiated with the laser generator.

The acupuncture needle packaging method according to the present invention may couple the acupuncture needle handle with the acupuncture needle tube using a laser instead of using a separate member. In other words, the light energy of the laser may be converted into the thermal energy and transferred to the acupuncture needle handle, and the inner wall of the acupuncture needle tube may be fused by the heat of the acupuncture needle handle, thereby coupling the acupuncture needle handle and acupuncture needle tube.

As a result, the material cost for packaging may be decreased, and the labor cost for the packaging may be decreased as the separate members are unnecessary to package the acupuncture needle and the acupuncture needle tube. In addition, since the acupuncture needle handle and the acupuncture needle tube are directly coupled without separate packaging components, it is possible for the acupuncture needle to be more easily separated by pressing the acupuncture needle handle.

DETAILED DESCRIPTION

In order to fully understand the present invention, exemplary embodiments of the present invention are described in the accompanying drawings. Exemplary embodiments of the present invention may be modified into several forms, and the scope of the present invention shall not be construed as being limited to those detailed below. The exemplary embodiments are provided for those with ordinary skill in the art to understand the present invention more fully. Therefore, the shape of elements in the drawing, etc., may be exaggerated for a clearer explanation. It should be noted that in each drawing, the same members are references by the same reference numerals. Detailed descriptions of the known functions and configurations that are deemed to unnecessarily obscure the disclosure are omitted.

Figure 2A:
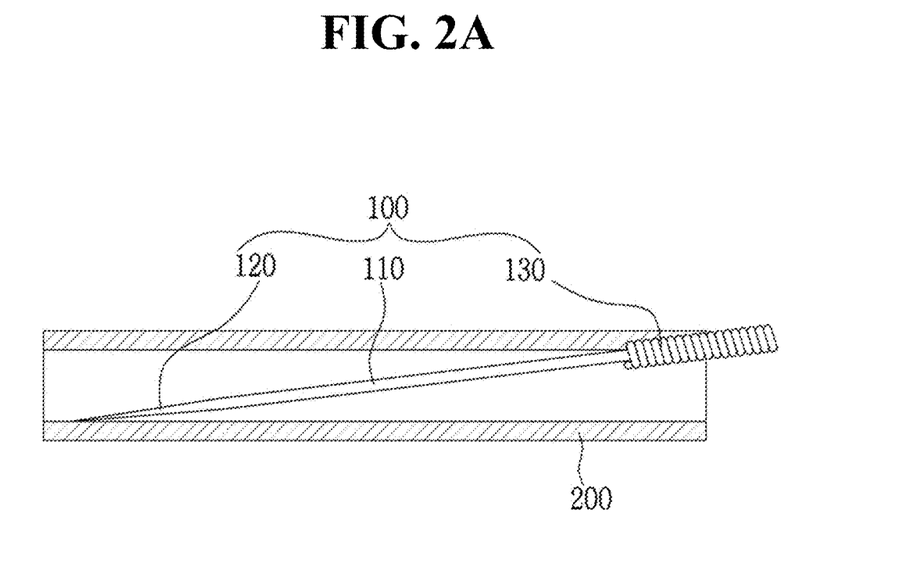
FIGS. 2A and 2B illustrate the structure of the acupuncture needle packaging structure according to an exemplary embodiment of the present invention.
Figure 2B:
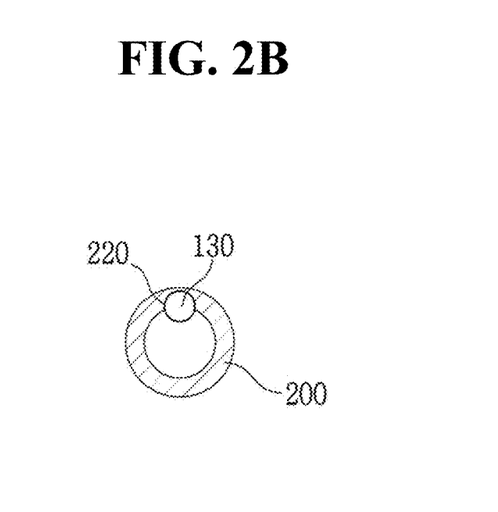

FIGS. 2A and 2B are cross-sectional diagrams of the structure of an acupuncture needle 100 and an acupuncture needle tube 200 packaged by the acupuncture needle packaging method according to the present invention. As illustrated in FIGS. 2A and 2B, the acupuncture needle packaging method according to the present invention may couple an acupuncture needle 100 and an acupuncture needle tube 200. According to the present invention, the acupuncture needle 100 may be coupled to the acupuncture needle tube 200 by a laser without a separate member. This configuration enables the packaging to be more simplified and may decrease manufacturing costs.

Figure 3A:
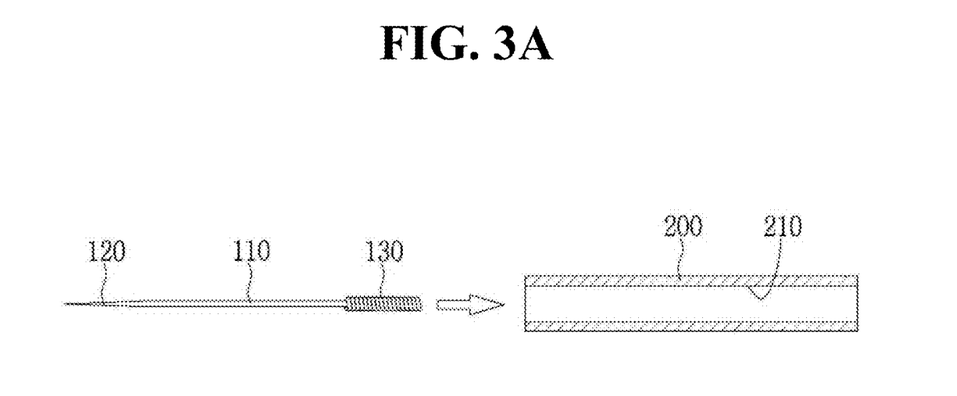
FIGS. 3A, 3B, 4A, 4B, 5A, 5B, 6A, and 6B show the process of packaging the acupuncture needle according to an exemplary embodiment of the present invention.

FIGS. 3A, 3B, 4A, 4B, 5A, 5B, 6A, and 6B show an acupuncture needle packaging process according to an exemplary embodiment of the present invention. As illustrated in FIG. 3A, the acupuncture needle 100 and the acupuncture needle tube 200 may be first provided for packaging the acupuncture needle. Acupuncture needle 100 may include biocompatible metals such as gold, platinum, stainless steel, and the like.

The acupuncture needle 100 may include an acupuncture needle body 110 and an acupuncture needle tip 120 disposed on a first side of the acupuncture needle body 110 for penetrating through human skin, and an acupuncture needle handle 130 disposed on a second side of the acupuncture needle body 110. The acupuncture needle 100 may be formed with various diameters and lengths depending on its function and location of acupuncture. The acupuncture needle handle 130 may include crests and roots that repeat in a spiral form on the surface, allowing more secure grip without slipping.

The acupuncture needle tube 200 may accommodate the acupuncture needle 100 therewithin. The acupuncture needle tube 200 may be formed in a circular or polygonal cross section and may be formed in a hollow shape to allow the acupuncture needle 100 to be accommodated. The acupuncture needle tube 200 may include polymer materials such as polypropylene, polyethylene, and low-density polyethylene (LDPE). The inner diameter of the acupuncture needle tube 200 may be greater than the outer diameter of the acupuncture needle handle 130 of the acupuncture needle 100 to allow it to move freely within the acupuncture needle tube 200.

The total length of the acupuncture needle tube 200 may be less than the length of the acupuncture needle 100. Due to such configuration, the upper part of the acupuncture needle 100 that is accommodated in the acupuncture needle tube 200, more particularly the upper part of acupuncture needle handle 130, may be exposed to the exterior of the acupuncture needle tube 200. The practitioner may press the acupuncture needle handle 130 exposed to the top of the acupuncture needle tube 200 with a finger to cause the acupuncture needle 100 to penetrate through the patient's skin. The acupuncture needle tube 200 may be formed in various specifications depending on different types of the acupuncture needle 100.

Figure 3B:
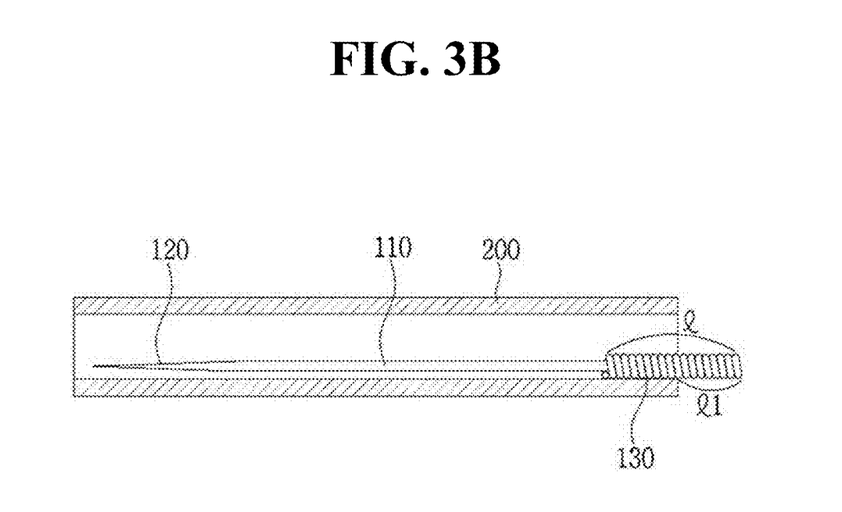

When a packaging worker inserts an acupuncture needle 100 inside the acupuncture needle tube 200, the upper portion of the acupuncture needle handle 130, as illustrated in FIG. 3B, may be exposed to the exterior of the acupuncture needle tube 200. In particular, the length (l1) of the acupuncture needle handle 130 exposed outside the acupuncture needle tube 200 may be about ⅓ to about ½ of the total length of the acupuncture needle handle 130. When the exposure length of the acupuncture needle handle 130 is within the above range, an enough force may be transferred during acupuncture.

Figure 4A:
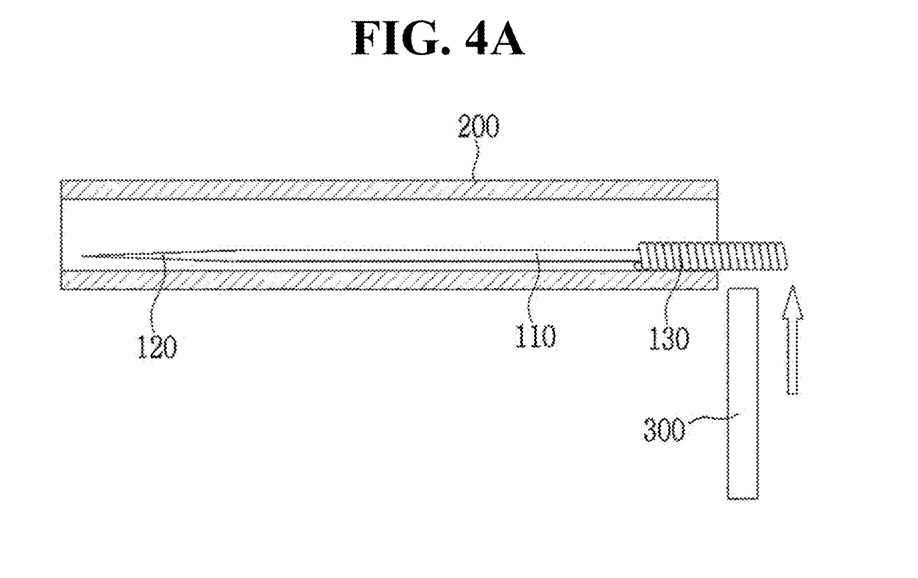

Since the inner diameter of the acupuncture needle tube 200 is greater than the outer diameter of the acupuncture needle handle 130, the acupuncture needle 100 may be laid on the inner floor of the acupuncture needle tube 200. In this state, the packaging worker may dispose a pressing jig 300 on a lower surface of the acupuncture needle handle 130 exposed to the exterior of the acupuncture needle tube 200, as illustrated in FIG. 4A. The pressing jig 300 may be configured to be ascended to a predetermined height and descended therefrom either mechanically by a motor or pneumatically. In some embodiments, the pressing jig 300 may be manually ascended and descended.

Figure 4B:
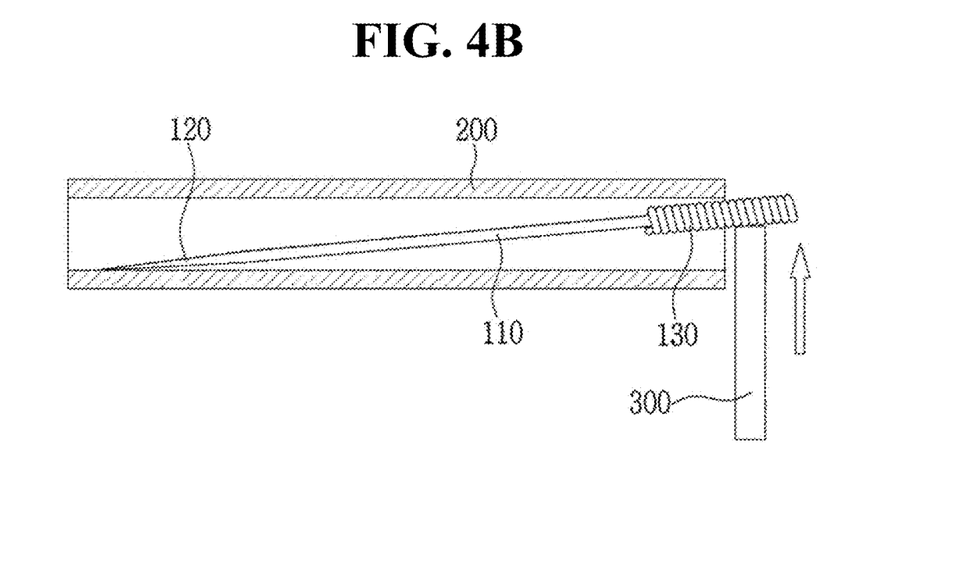

As shown in FIG. 4B, the pressing jig 300 may be primarily ascended upward (i.e., first ascension). The height of the first ascension of the pressing jig 300 may correspond to a position where the acupuncture needle handle 130 contacts the upper inner diameter of the acupuncture needle tube 200. When the acupuncture needle handle 130 reaches the upper inner diameter of the acupuncture needle tube 200, the acupuncture needle body 110 may be disposed obliquely within the acupuncture needle tube 200. In other words, the acupuncture needle tip 120 may be disposed on the inner floor of the acupuncture needle tube 200, and the acupuncture needle handle 130 may be obliquely disposed to allow it to contact the upper inner surface of the acupuncture needle tube 200.

Figure 5A:
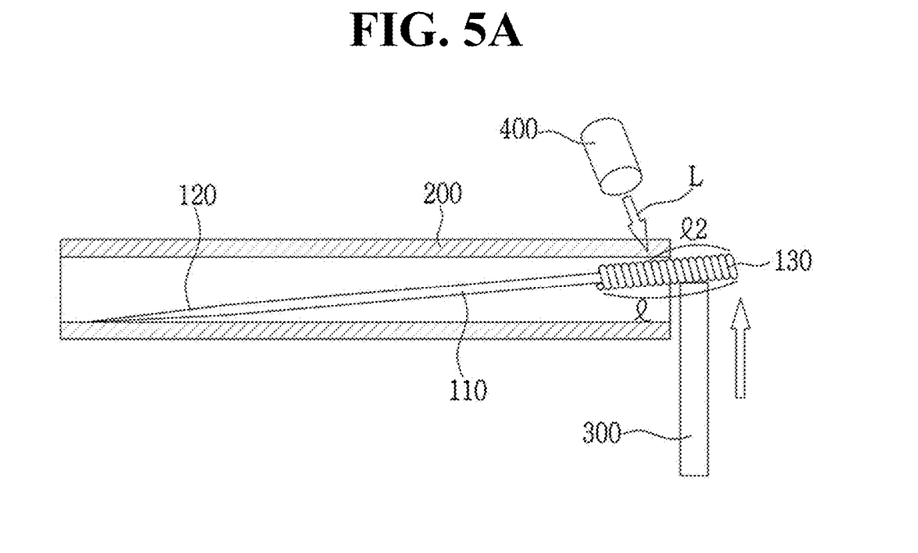

In this state, as illustrated in FIG. 5A, the packaging worker may place a laser generator 400 over the acupuncture needle tube 200 and irradiate the laser (L) into the area of the acupuncture needle handle 130 and the acupuncture needle tube 200. For example, the area in which the laser (L) is irradiated may be in the range of about ⅗ to about ⅔ from the top for the length (l) of the total acupuncture needle handle 130. When the area of the laser (L) irradiation was within the above range, optimal effects were shown through numerous experiments.

Figure 5B:
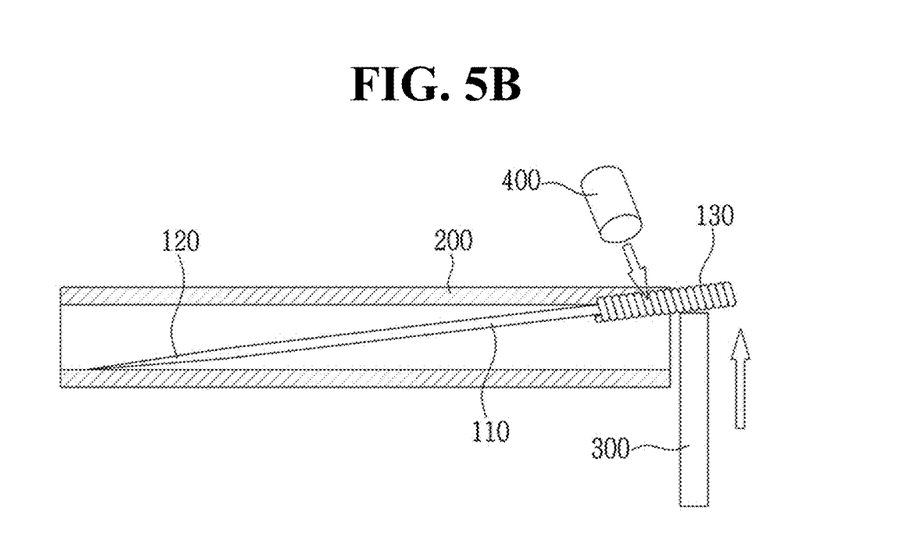

When the packaging worker irradiates the laser (L) with the laser generator 400 to the acupuncture needle tube 200, the pressing jig 300 may be further ascended upward (i.e., second ascension), as illustrated in FIG. 5B. When the laser (L) is irradiated to the acupuncture needle tube 200, the laser (L) beam may pass through the acupuncture needle handle 130 made of the polypropylene material and may be irradiated to the acupuncture needle handle 130.

As shown in FIG. 5B, the height to which the pressing jig 300 is ascended for the second time, may be limited to prevent the end of the acupuncture needle tube 200 from penetrating through. If the pressing jig 300 is ascended higher than this height, the acupuncture needle handle 130 may penetrate through (e.g., rip through) the acupuncture needle tube 200 and damage the outer surface of the acupuncture needle tube 200.

The laser generator 400 may irradiate the acupuncture needle tube 200 with about 70 W laser beam for about 1 to about 2 seconds. When the irradiation intensity and duration were within the above range, optimal effects were shown through numerous experiments.

The laser (L) irradiated toward the acupuncture needle tube 200 may penetrate through the transparent acupuncture needle tube 200, and when the laser (L) reaches the acupuncture needle handle 130 that is made of the metallic material, the light energy of the laser (L) may be converted into thermal energy. Accordingly, the thermal energy may generate heat in the acupuncture needle handle 130. When heat is generated in the acupuncture needle handle 130, the heat may be conducted to the inner wall 210 of the acupuncture needle tube 200 which abuts the acupuncture needle handle 130. The inner wall of the acupuncture needle tube 200 which abuts the acupuncture needle handle 130 may reach a glass transition temperature and melt. In this state, as the pressing jig 300 is ascended for the second time and the acupuncture needle handle 130 is accordingly ascended, the inner wall 210 of the acupuncture needle tube 200 may be deformed into the shape of the acupuncture needle handle 130.

Figure 6A:
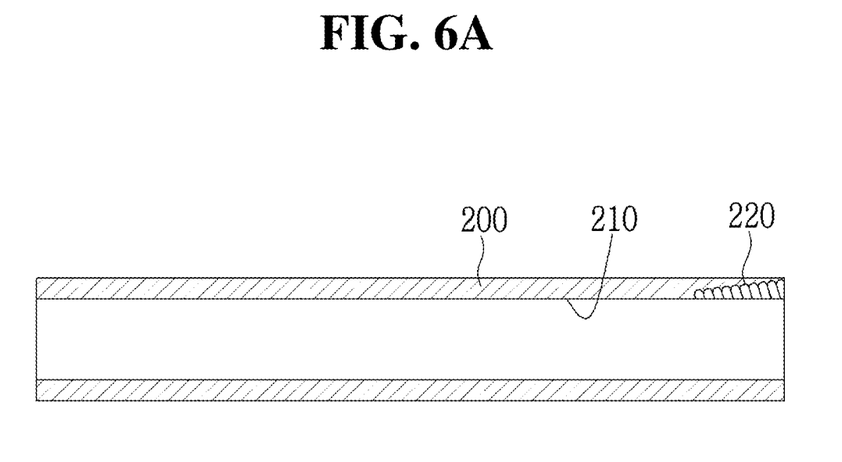
Figure 6B:
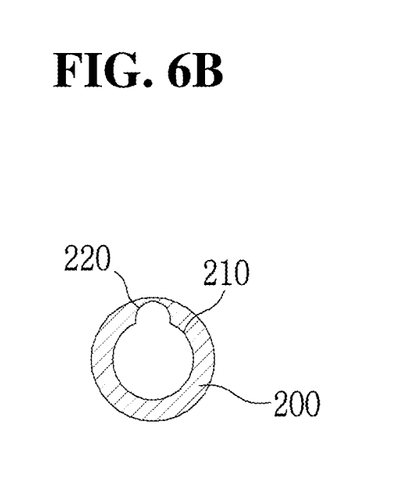

In other words, a deformation zone 220 may be formed on the inner wall 210 of the acupuncture needle tube 200 that corresponds to the spiral shape of the acupuncture needle handle 130, as illustrated in FIGS. 6A and 6B. The deformation zone 220 may be cooled in contact with the acupuncture needle handle 130, resulting in plastic deformation and may couple the acupuncture needle handle 130 to the inner wall 210 of the acupuncture needle tube 200 as illustrated in FIGS. 2A and 2B.

The acupuncture needle handle 130 may be coupled to the acupuncture needle tube 200 with a predetermined depth inserted into the acupuncture needle tube 200, and therefore, the spiral shape of the acupuncture needle handle 130 and the spiral shape of the deformation zone 220 that correspond to each other may be coupled together. This configuration may maintain a stable coupling of the acupuncture needle 100 and the acupuncture needle tube 200.

The acupuncture needle 100 and the acupuncture needle tube 200 that are coupled to each other may be stored and distributed inside a packaging material (not shown).

When a practitioner, such as an oriental medicine doctor, administer acupuncture to a patient, the practitioner may separate the acupuncture needle handle 130 from the acupuncture needle tube 200 by pressing the end of the acupuncture needle handle 130 downward. As the acupuncture needle handle 130 is separated from the acupuncture needle tube 200, the practitioner may administer the acupuncture needle 100 into the patient's skin.

FIGS. 7A-7D show another exemplary embodiment of the acupuncture needle packaging method according to the present invention. The acupuncture needle packaging method described above may raise the upper part of the acupuncture needle handle 130 in the upward direction by the pressing jig 300 to the upper wall of the acupuncture needle tube 200. Alternatively, the acupuncture needle packaging method according to the another exemplary embodiment of the present invention may couple the acupuncture needle handle 130 with the inner wall of the lower wall of the acupuncture needle tube 200.

Figure 7A:
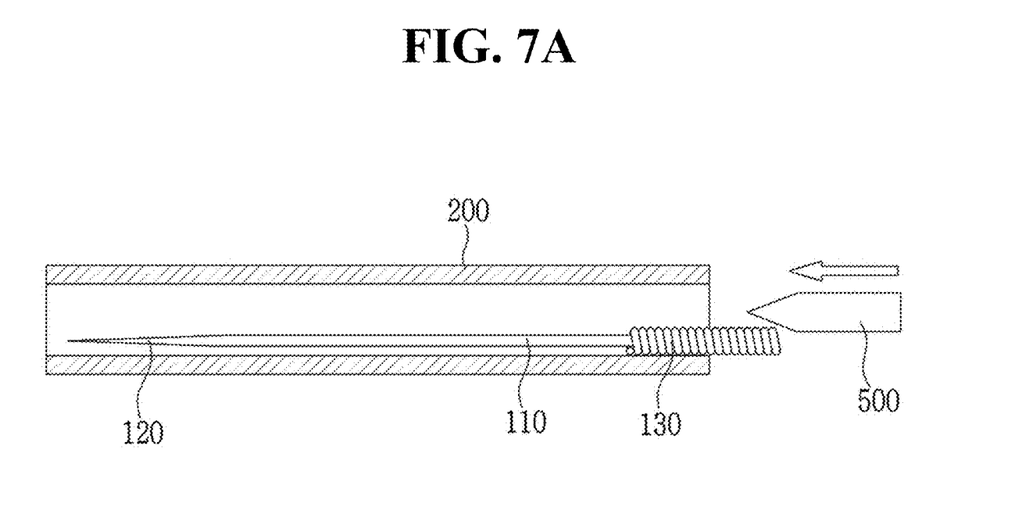
FIGS. 7A-7D show the process of packaging the acupuncture needle according to another exemplary embodiment of the present invention.
Figure 7B:
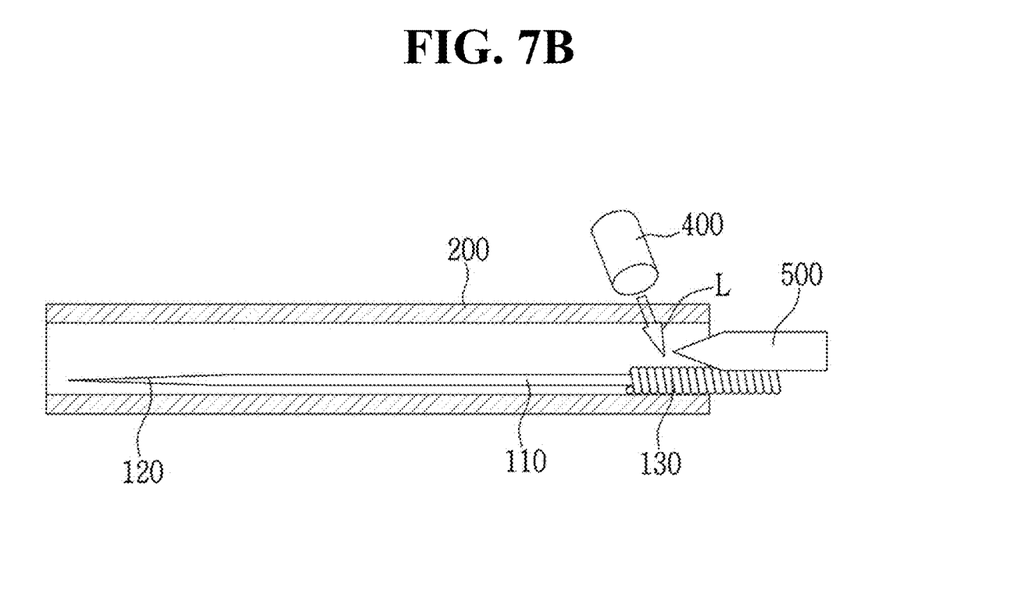

The acupuncture needle packaging method according to the another exemplary embodiment of the present invention may include inserting a pressing jig 500 into an interior of the acupuncture needle tube 200, as illustrated in FIG. 7A. The pressing jig 500 may be inserted between the acupuncture needle tube 200 and the acupuncture needle handle 130. The pressing jig 500 may be inserted as illustrated in FIG. 7B, and may press the acupuncture needle handle 130 downward (e.g., toward the inner bottom surface of the acupuncture needle tube 200). In addition, a laser generator 400 may irradiate laser (L) into the area where the acupuncture needle handle 130 and the acupuncture needle tube 200 abut each other.

Figure 7C:
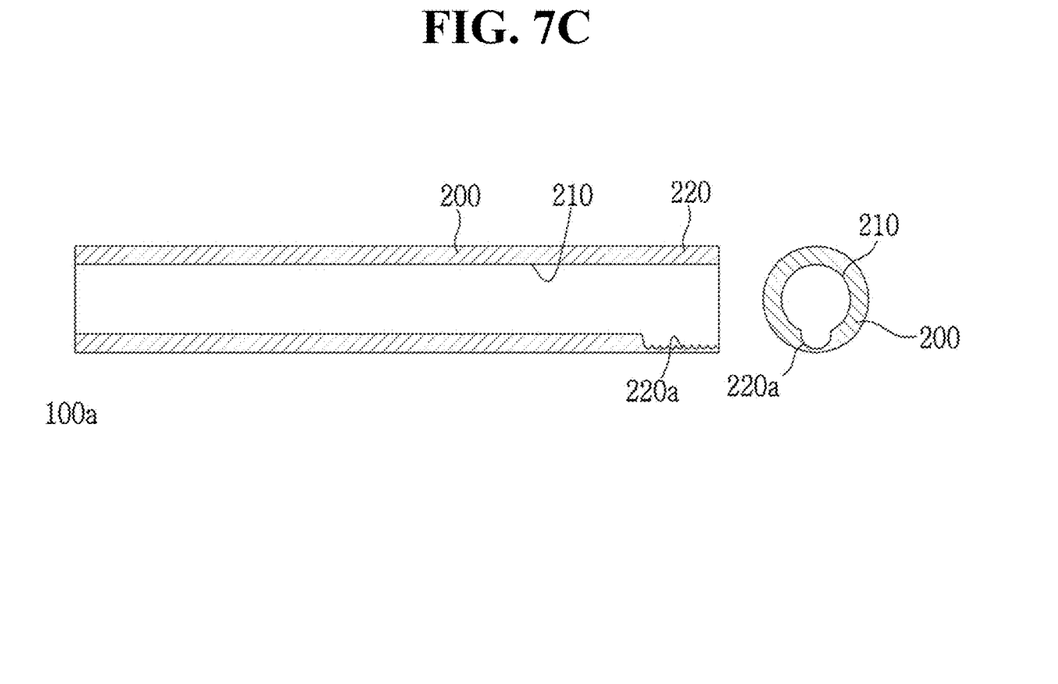
Figure 7D:
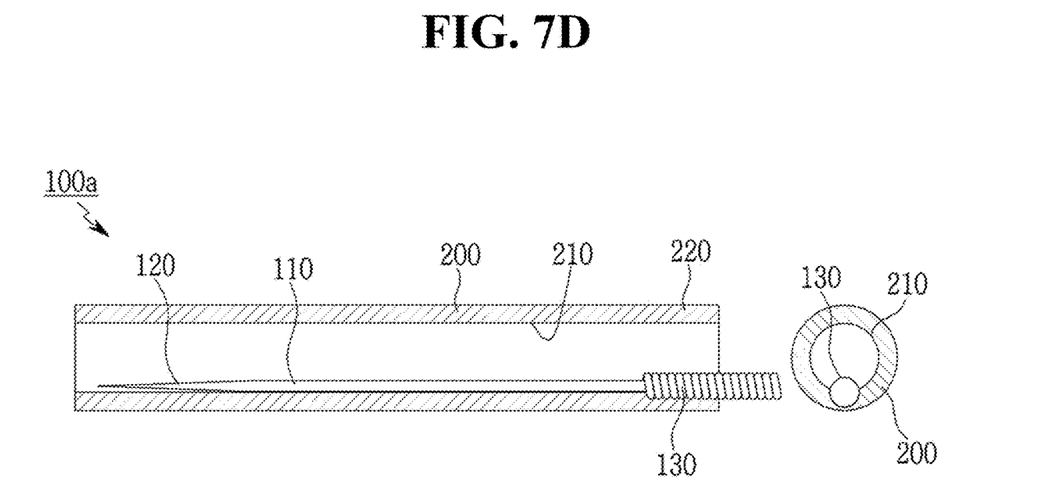

As illustrated in FIG. 7C, the heat generated at the acupuncture needle handle 130 by the laser (L) may deform the inside wall of the acupuncture needle tube 200, and the acupuncture needle handle 130 may be coupled with the inner wall of acupuncture needle tube 200 as shown in FIG. 7D.

As discussed above, the acupuncture needle packaging method according to the present invention may couple the acupuncture needle handle with the acupuncture needle tube using a laser without using separate members such as the needle-fixing tension member. In other words, the light energy of the laser may be converted into thermal energy and transferred to the acupuncture needle handle, and the inner wall of the acupuncture needle tube may be fused by the heat of the acupuncture needle handle, thereby coupling the acupuncture needle tube and the acupuncture needle handle.

As a result, the unit price of the packaging may be decreased, and the labor for the packaging may be reduced as the separate members are unnecessary to package the acupuncture needle and the acupuncture needle tube. In addition, since the acupuncture needle handle and the acupuncture needle tube are directly coupled without separate packaging materials, the acupuncture practitioner may separate the acupuncture needle handle and the acupuncture needle tube more conveniently by an action of pressing the acupuncture needle handle.

Meanwhile, a corrosion protection layers may be applied on the acupuncture needle body 110 in order to prevent or minimize corrosion. For example, the corrosion protection layer may include about 20 weight % of guanadino benzimidazol, about 15 weight % of oxycarboxylic acid, about 10 weight % of imidazoline thion, about 15 weight % of hafnium, about 10 weight % of molybdenum disulfide ($MoS_2$), about 25 weight % of aluminum oxide, and about 5 weight % of diglycidyl aniline. The coating thickness of the corrosion protection layer may be about 7 μm.

Guanadino benzimidazol, oxycarboxylic acid, imidazoline thion, and diglycidyl aniline may serve as an anti-corrosion or anti-discoloration agent. Hafnium is a metastatic metallic element with corrosion resistance and may provide waterproofness, corrosion resistance, and the like. Molybdenum disulfide may provide the surface of the coating film with slidability and lubrication. Aluminum oxide may be added for fire resistance and chemical stability. When the composition and the coating thickness satisfied the above conditions, optimal anti-corrosion effects were shown through numerous experiments.

In addition, an anti-pollution layer may be applied to the inner surface of the acupuncture needle tube 200 to more effectively prevent attachment of contaminants and facilitate removal thereof. For example, the composition for the anti-pollution layer may include amphodiglycine and sorbitol esters in about 1:0.01 to about 1:2 mole ratio, and the total content of amphodiglycine and sorbitol esters may be about 1 to about 10 weight % of the total solution.

When the mole ratio of amphodiglycine and solvitol ester was about 1:0.01 to about 1:2, the ease of application may be increased, and a problem of absorbing moisture and delamination of the anti-pollution layer may be prevented or minimized. Further, about 1 to about 10 weight % of amphodiglycine and solvitol ester in the total solution may ensure the applicability to the acupuncture needle tube 200 and may prevent crystallization due to an increase of the coating thickness.

Meanwhile, the anti-pollution solution may be applied to the acupuncture needle tube 200 by a spraying method. In addition, the final thickness of the application layer of the acupuncture needle tube 200 may be between about 500 and about 2000 Å, and more preferably may be between about 1000 and about 2000 Å. When the coating thickness is within the above ranges, deterioration of the coating may be prevented during a high-temperature heat treatment, and the crystallization may be prevented. In addition, the anti-pollution solution may be prepared by adding 0.1 mole of amphodiglycine and 0.05 mole of sorbitol ester to 1000 ml of distilled water.

In addition, aromatic substances with sterilizing functions may be coated around the circumference of the acupuncture needle tube 200, to achieve effects such as sterilizing the acupuncture needle tube 200 and relieving the stress of workers.

The aromatic substances may include functional oils. The mixing ratio may be about 95 to about 97 weight % of aromatic substances and about 3 to about 5 weight % of functional oils. The functional oils may include about 50 weight % of cardamom oil and about 50 weight % of marigold oil. The functional oils may be mixed to be about 3 to about 5 weight % with respect to the aromatic substances. When the functional oil is within the above range, sufficient effects may be realized without significantly increasing the manufacturing cost.

The main ingredient of the cardamom oil may include terpineol and cineol, and the cardamom oil may have such effects of neuralgia, sterilization, antidepressant, and stress relief. Marigold oil is an oil extracted from the petals of the marigold and may have such effects of treating skin diseases, sterilizing, itching relieving, clearing the head, and relaxing tension. Since these functional oils are coated around the circumference of the acupuncture needle tube 200, the effects such as sterilizing the acupuncture needle tube 200 and relieving the stress of the practitioner may be achieved.

The embodiments of the acupuncture needle packaging method according to the present invention described above are exemplary, and those with ordinary skill in the art to which the present invention pertains will be able to understand that various variations and other equivalent modifications are possible. Therefore, it should be understood that the present invention is not limited to the forms referred to in the above detailed description. Therefore, the true scope of the present invention should be determined by the technical idea of the appended claims. In addition, the present invention includes the spirit as defined by the scope of the appended claims, as well as all variations, equivalents, and substitutes within such scope.

What is claimed is:

1. A method of acupuncture needle packaging, comprising:

inserting an acupuncture needle body of an acupuncture needle that includes an acupuncture needle handle at an upper portion thereof into an acupuncture needle tube starting from the acupuncture needle handle;

disposing the acupuncture needle in the acupuncture needle tube in a state in which the upper portion of the acupuncture needle handle is exposed to an exterior of the acupuncture needle tube;

ascending the upper portion of the acupuncture needle handle exposed to the exterior of the acupuncture needle tube vertically using a pressing jig;

with the acupuncture needle obliquely disposed within the acupuncture needle tube, irradiating a laser using a laser generator to an area where the acupuncture needle tube and the acupuncture needle handle abut each other; and coupling the acupuncture needle handle and the acupuncture needle tube by thermally deforming the area where the acupuncture needle tube and the acupuncture needle handle abut each other with a heat generated at the acupuncture needle handle due to the laser irradiated with the laser generator.

2. The method of claim 1, wherein 1/3 to 1/2 of the acupuncture needle handle is exposed to the exterior of the acupuncture needle tube, and the laser generator irradiates the laser to 3/5 to 2/3 region of the acupuncture needle handle for 1 to 2 seconds.

3. The method of claim 1, wherein the acupuncture needle tube includes a transparent polymer material selected from the group consisting of polypropylene, polyethylene, and low density polyethylene (LDPE).

4. The method of claim 1, wherein the acupuncture needle handle includes a spiral shape in an outer surface thereof, wherein a deformation zone is formed due to the laser at an inner wall of the acupuncture needle tube where the acupuncture needle handle abuts the acupuncture needle tube to correspond to the spiral shape of the acupuncture needle handle, and wherein the spiral shape of the acupuncture needle handle and the deformation zone of the acupuncture needle tube are fitted together to allow the acupuncture needle and the acupuncture needle tube to be coupled.

5. The method of claim 1, wherein a spiral shape of the acupuncture needle handle and a deformation zone of the acupuncture needle tube are configured to be separated by pressing the upper portion of the acupuncture needle handle exposed to the exterior of the acupuncture needle tube.

6. The method of claim 1, wherein a corrosion protection layer is applied to the acupuncture needle body, the corrosion protection layer including 20 weight % of guanadino benzimidazol, 15 weight % of oxycarboxylic acid, 10 weight % of imidazoline thion, 15 weight % of hafnium, 10 weight % of molybdenum disulfide, 25 weight % of aluminum oxide, and 5 weight % of diglycidyl aniline, and wherein a coating thickness of the corrosion protection layer is about 7 μm.

7. The method of claim 1, wherein an interior of the acupuncture needle tube is covered by a layer of anti-pollution layer including a composition with 1:0.01 to 1:2 mole ratio of amphodiglycine and sorbitol esters.

8. The method of claim 1, wherein a circumference of the acupuncture needle tube is applied with a mixture of an aromatic substance and a functional oil, the mixture including 95 to 97 weight % of the aromatic substance and 3 to 5 weight % of the functional oil, wherein the functional oil includes 50 weight % of cardamom oil and 50 weight % of marigold oil.

9. An acupuncture needle provided by the method of acupuncture needle packaging according to claim 1.

10. A method of acupuncture needle packaging, comprising:

inserting an acupuncture needle body of an acupuncture needle that includes an acupuncture needle handle at an upper portion thereof into an acupuncture needle tube starting from the acupuncture needle handle;

disposing the acupuncture needle in the acupuncture needle tube in a state in which the upper portion of the acupuncture needle handle is exposed to an exterior of the acupuncture needle tube;

inserting a pressing jig into an interior of the acupuncture needle tube to press the upper portion of the acupuncture needle handle downward;

irradiating a laser using a laser generator to an area where the acupuncture needle tube and the acupuncture needle handle abut each other, with the acupuncture needle horizontally disposed within the acupuncture needle tube; and coupling the acupuncture needle handle and the acupuncture needle tube by thermally deforming the area where the acupuncture needle tube and the acupuncture needle handle abut each other with a heat that is generated at the acupuncture needle handle due to the laser irradiated with the laser generator.

11. An acupuncture needle provided by the method of acupuncture needle packaging according to claim 10.

* * * * *